US012756069B2

(12) United States Patent
Lo et al.

(10) Patent No.: US 12,756,069 B2
(45) Date of Patent: Oct. 6, 2026

(54) SEPARATOR AND A METHOD FOR MANUFACTURING THEREOF

(71) Applicant: BenQ Materials Corporation, Taoyuan (TW)

(72) Inventors: Wan-Ting Lo, Taoyuan (TW); Yi-Ting Lo, Taoyuan (TW); Meng-Chia Cheng, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 497 days.

(21) Appl. No.: 18/480,611

(22) Filed: Oct. 4, 2023

(65) Prior Publication Data

US 2025/0055135 A1 Feb. 13, 2025

(30) Foreign Application Priority Data

Aug. 11, 2023 (TW) ................................ 112130237

(51) Int. Cl.

| | |
|---|---|
| ***H01M 50/451*** | (2021.01) |
| ***H01M 10/052*** | (2010.01) |
| ***H01M 50/417*** | (2021.01) |
| ***H01M 50/434*** | (2021.01) |
| *H01M 50/491* | (2021.01) |

(52) U.S. Cl.

CPC ....... *H01M 50/451* (2021.01); *H01M 10/052* (2013.01); *H01M 50/417* (2021.01); *H01M 50/434* (2021.01); *H01M 50/491* (2021.01)

(58) Field of Classification Search

CPC ............. H01M 50/451; H01M 10/052; H01M 50/417; H01M 50/434; H01M 50/491; H01M 50/446; H01M 50/403

See application file for complete search history.

(56) References Cited

U.S. PATENT DOCUMENTS

| | | | | |
|---|---|---|---|---|
| 6,511,774 | B1 * | 1/2003 | Tsukuda ................. | D21H 19/02 429/142 |
| 2006/0078791 | A1 * | 4/2006 | Hennige ............. | H01M 50/497 429/251 |
| 2011/0020692 | A1 | 1/2011 | Ikemoto et al. | |
| 2018/0212219 | A1 | 7/2018 | Kim et al. | |
| 2022/0294078 | A1 * | 9/2022 | Kim .................... | H01M 50/446 |

FOREIGN PATENT DOCUMENTS

| | | | | |
|---|---|---|---|---|
| CN | 103199211 | * | 7/2013 | ............. H01M 2/16 |
| CN | 106299220 | A | 1/2017 | |
| CN | 107849764 | A | 3/2018 | |
| TW | 202137606 | A | 10/2021 | |
| TW | 202219199 | A | 5/2022 | |
| WO | 2015023116 | A1 | 2/2015 | |
| WO | 2015105223 | A1 | 7/2015 | |

OTHER PUBLICATIONS

CN 103199211 machine English translation (Year: 2013).*

Liu et al. "Ultrathin ZrO2-coated separators based on surface sol-gel process for advanced lithium ion batteries." Journal of Membrane Science 592 (2019) 117368 (Year: 2019).*

Zhu et al. "TiO2 ceramic-grafted polyethylene separators for enhanced thermostability and electrochemical performance of lithium-ion batteries." Journal of Membrane Science 504 (2016) 97-103 (Year: 2016).*

* cited by examiner

*Primary Examiner* — Michael L Dignan

(57) ABSTRACT

A separator and a method for manufacturing thereof are disclosed. The separator comprises an enhanced porous polyolefin substrate and an inorganic layer, wherein the enhanced porous polyolefin substrate is obtained by pre-strengthening a porous polyolefin substrate, and the inorganic layer comprises a plurality of inorganic particles and a binder and coated on at least one surface of the enhanced porous polyolefin substrate, and the pre-strengthening treatment comprises sequentially applying a titanium alkoxide solution and an alcohol solution. The separator of the present invention has improved tensile strength and good compression resistance.

20 Claims, No Drawings

SEPARATOR AND A METHOD FOR MANUFACTURING THEREOF

CROSS-REFERENCE TO RELATED APPLICATION

This application claims the benefit of Taiwanese patent application serial No. 112130237, filed on Aug. 11, 2023, the subject matter of which is incorporated herein by reference.

BACKGROUND OF THE INVENTION

Field of Invention

This invention relates to a separator and a method for manufacturing thereof, and more particularly to a separator with an enhanced tensile strength and compression resistance and a method for manufacturing thereof.

Description of Related Art

Lithium battery is composed of four main parts, positive electrode material, negative electrode material, separator, and electrolyte, wherein the separator is a thin film with a microporous structure, which is mainly used to separate the positive electrode and negative electrode of the battery to prevent the electric short and allow free ions passing through between the electrodes. Therefore, the separator has a decisive influence on the discharge rate, energy density, cycle performance and safety of lithium batteries.

The separator can be mainly manufactured dry-stretching method or wet-stretching method. The dry-stretching separator has high safety and low cost, so it is mostly used in large-scale lithium iron phosphate power batteries. The wet-stretching separator can provide better air permeability due to its thin thickness, high porosity and uniform pore size. However, the wet stretching separator needs to have a coating layer to meet the safety requirements of thermal stability and tensile strength.

When the capacity of the battery is increased, it is generally desired that the separator is thin, so that the ions are easy to pass through and move. In battery assembly and charge-discharge cycle use, the separator itself is expected to have a certain mechanical strength. Since the mechanical strength of the separator may decrease after thinning, it is important to improve the mechanical strength of the separator in order to maintain electrical insulation and ion permeability.

Therefore, it is necessary for the separator to have enhanced mechanical strength to ensure the safety of the battery.

SUMMARY OF THE INVENTION

The present invention discloses a separator with enhanced tensile strength and good compression resistance, and a manufacturing method thereof. On the other hand, the separator disclosed in the present invention has high temperature shrinkage resistance and high puncture strength.

One aspect of the present invention is to provide a separator comprising an enhanced porous polyolefin substrate and an inorganic layer. The enhanced porous polyolefin substrate is obtained by pre-strengthening a porous polyolefin substrate. The inorganic layer comprises a plurality of inorganic particles and a binder, and is coated on at least one surface of the enhanced porous polyolefin substrate, wherein the enhanced porous polyolefin substrate is obtained by sequentially applying a 0.1 wt % to 3 wt % titanium alkoxide solution and an 30 wt % to 70 wt % alcohol solution to the porous polyolefin substrate.

In an embodiment of the present invention, the titanium alkoxide of the titanium alkoxide solution for pre-strengthening the porous polyolefin substrate is titanium methoxide, titanium ethoxide, titanium isopropoxide, titanium tert-butoxide, or combinations thereof, and the solvent of the titanium alkoxide solution is methanol, ethanol, isopropanol, or combinations thereof.

In an embodiment of the present invention, the alcohol of alcohol solution for pre-strengthening the porous polyolefin substrate is methanol, ethanol, isopropanol, ethoxyethanol, allyl alcohol, ethylene glycol, or combinations thereof.

In an embodiment of the present invention, the titanium alkoxide solution for pre-strengthening the porous polyolefin substrate further comprises a 0.5 wt % to 5 wt % hexamethyldisilazane.

In an embodiment of the present invention, the alcohol solution for pre-strengthening the porous polyolefin substrate further comprises a tackifier, and the using amount of the tackifier in the alcohol solution is 0.01 wt % to 1 wt %.

In an embodiment of the present invention, the tackifier is poly(meth)acrylate, poly-n-vinylacetamide, crosslinkable (meth)acrylic resin, acrylonitrile-acrylate copolymer, acrylonitrile-acrylamide-acrylate copolymer, or combinations thereof.

In an embodiment of the present invention, the inorganic layer comprises 80 wt % to 99 wt % inorganic particles and a 1 wt % to 20 wt % binder. In a preferred embodiment of the present invention, the inorganic layer is coated on one or both surfaces of the enhanced porous polyolefin substrate. The thickness of the inorganic layer is between 0.5 μm and 5 μm, and is preferably between 0.5 μm and 3 μm.

In an embodiment of the present invention, the inorganic particles of the inorganic layer are Mg(OH)2, BaSO4, BaTiO3, HfO2, SrTiO3, SnO2, CeO2, MgO, NiO, CaO, ZnO, ZrO2, SiO2, Y2O3, Al(OH)3, Al2O3, AlOOH, SiC, TiO2, or combinations thereof.

In an embodiment of the present invention, the average particle diameter (D50) of the inorganic particles is between 0.1 μm and 2.0 μm.

In an embodiment of the present invention, the binder of the inorganic layer is ethylene-vinyl acetate copolymer (EVA), poly(meth)acrylate, crosslinkable (meth)acrylic resin, fluororubber, styrene-butadiene rubber (SBR), polyvinyl alcohol (PVA), polyvinyl butyral (PVB), polyvinylpyrrolidone (PVP), poly-n-vinyl acetamide, polyvinylidene fluoride (PVDF), polyurethane, or combinations thereof.

Another aspect of the present invention is to provide a method for manufacturing a separator which comprises the steps of providing a porous polyolefin substrate; pre-strengthening the porous polyolefin substrate to form an enhanced porous polyolefin substrate, wherein the step of pre-strengthening comprises sequentially applying a 0.1 wt % to 3 wt % titanium alkoxide solution and a 30 wt % to 70 wt % alcohol solution to the porous polyolefin substrate; and coating an inorganic layer comprising a plurality of inorganic particles and a binder on at least one surface of the enhanced porous polyolefin substrate.

In an embodiment of the present invention, the titanium alkoxide of the titanium alkoxide solution in the step of pre-strengthening the porous polyolefin substrate is titanium methoxide, titanium ethoxide, titanium isopropoxide, titanium tert-butoxide, or combinations thereof, preferably titanium isopropoxide, and the solvent of the titanium alkoxide solution is methanol, ethanol, isopropanol, or combinations thereof.

In an embodiment of the present invention, the alcohol of alcohol solution in the step of pre-strengthening the porous polyolefin substrate is methanol, ethanol, isopropanol, ethoxyethanol, allyl alcohol, ethylene glycol, or combinations thereof. In a preferred embodiment of the present invention, the alcohol of alcohol solution is methanol, ethanol, isopropanol, or combinations thereof.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the following description, numerous specific details are described in detail in order to enable the reader to fully understand the following examples. However, embodiments of the present invention may be practiced in case no such specific details.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The term "(meth)acrylate" used herein refers to acrylate or methacrylate.

The present invention is to provide a separator with an enhanced tensile strength and compression resistance, and a method for manufacturing thereof. The separator of the present invention can have enhanced tensile strength and compression resistance of the separator without increasing the total thickness of the separator. On the other hand, the separator disclosed in the present invention has high temperature shrinkage resistance and high puncture strength.

The separator of the present invention comprises an enhanced porous polyolefin substrate and an inorganic layer. The enhanced porous polyolefin substrate is obtained by pre-strengthening a porous polyolefin substrate. The inorganic layer comprises a plurality of inorganic particles and a binder, and is coated on at least one surface of the enhanced porous polyolefin substrate, wherein the enhanced porous polyolefin substrate is obtained by sequentially applying a 0.1 wt % to 3 wt % titanium alkoxide solution and an 30 wt % to 70 wt % alcohol solution to the porous polyolefin substrate.

In the separator of the present invention, the enhanced porous polyolefin substrate is obtained by forming a titanium oxide and/or titanium hydroxide film through pre-strengthening treatment on the surfaces and the inner walls of the porous structures of the porous polyolefin substrate to strengthen the structure of the porous polyolefin substrate to avoid large difference in material modulus or mechanical strength between the organic porous polyolefin substrate and the inorganic layer, which is beneficial to the separator formed after the subsequent coating of the inorganic layer with an enhanced tensile strength and an overall better compression resistance.

In the separator of the present invention, the porous polyolefin substrate can be, for example but not limited to, a single-layered polyethylene or a single-layered polypropylene. In an embodiment of the present invention, the thickness of the porous polyolefin substrate is between 5 μm and 30 μm, and is preferably between 7 μm and 25 μm, and the porosity of the porous polyolefin substrate is between 30% and 60%.

In an embodiment of the present invention, the pre-strengthening treatment comprises sequentially applying a 0.2 wt % to 2.5 wt % titanium alkoxide solution and a 40 wt % to 60 wt % alcohol solution to the porous polyolefin substrate.

In an embodiment of the present invention, the pre-strengthening treatment can be repeated as needed, that is, the porous polyolefin substrate is treated by sequentially applying the titanium alkoxide solution and the alcohol solution more than once, and when the pre-strengthening treatment of the titanium alkoxide solution and the alcohol solution is repeated, the concentration of the titanium alkoxide solution and the alcohol solution may be the same or different, as long as the concentration range disclosed above in the present disclosure is used.

In the separator of the present invention, the titanium alkoxide solution for pre-strengthening the porous polyolefin substrate further comprises a 0.5 wt % to 5 wt % hexamethyldisilazane to stabilize the titanium alkoxide solution in order to avoid the premature precipitation of titanium alkoxide during the reaction of the titanium alkoxide solution with the alcohol solution, and allow the titanium alkoxide to enter the pores of the porous polyolefin substrate to form a composite film of titanium oxide and/or titanium hydroxide and hexamethyldisilazane on the inner walls of the porous structures with the alcohol solution. The using amount of hexamethyldisilazane in the titanium alkoxide solution is preferably between 0.5 wt % and 3 wt %, more preferably between 0.5 wt % and 2 wt %.

In an embodiment of the present invention, the alcohol solution for pre-strengthening the porous polyolefin substrate further comprises a tackifier to enhance the adherence of the titanium oxide and/or titanium hydroxide, which is formed through the reaction of the titanium alkoxide with the alcohol solution, to the surfaces and the inner walls of the porous structures of the porous polyolefin substrate. Suitable tackifiers can be, for example but not limited to, poly(meth)acrylate, crosslinkable (meth)acrylic resin, poly-n-vinylacetamide, acrylonitrile-acrylate copolymer, acrylonitrile-acrylamide-acrylate copolymer, or combinations thereof. In a preferred embodiment of the present invention, one or more than one tackifier can be used in the alcohol solution.

In the separator of the present invention, the using amount of the tackifier in the alcohol solution is 0.01 wt % to 1.0 wt %, and preferably 0.05 wt % to 0.5 wt %.

In the separator of the present invention, suitable tackifiers can be obtained from commercialized products, for example BM-950B (available from ZEON Corp. JP), PNVA GE191 series like GE191-103, GE191-104, GE191-107 or GE191-108 (available from Showa Denko K.K., JP), Soteras™ CCS-V Binder (available from Ashland Inc., USA) or CYJ-01 (available from Zhuhai Chenyu New Material Technology Co., Ltd, CN).

In the separator of the present invention, the alcohol solution for pre-strengthening the porous polyolefin substrate can further comprise additives such as flame retardants, antioxidants, surface modifiers or antistatic agents.

In the separator of the present invention, the titanium alkoxide solution and the alcohol solution for the pre-strengthening treatment can be dip coating or spray coating.

In the separator of the present invention, the inorganic layer is formed on one or two surfaces of the enhanced porous polyolefin substrate. The inorganic layer includes a plurality of inorganic particles and a binder, wherein the inorganic layer contains 80 wt % to 99 wt % of inorganic particles and 1 wt % to 20 wt % of binder. In an embodiment of the present invention, the thickness of the inorganic layer is between 0.5 μm and 5 μm. The inorganic layer can be coated on single side or on double sides of the enhanced porous polyolefin substrate with a thickness between 0.5 μm and 3 μm, and more preferably on double sides of the enhanced porous polyolefin substrate.

In the separator of the present invention, suitable inorganic particles for the inorganic layer are $Mg(OH)_2$, $BaSO_4$, $BaTiO_3$, $HfO_2$, $SrTiO_3$, $SnO_2$, $CeO_2$, MgO, NiO, CaO, ZnO, $ZrO_2$, $SiO_2$, $Y_2O_3$, $Al_2O_3$, AlOOH, SiC, $TiO_2$, or combinations thereof. Furthermore, the size of the gaps formed between inorganic particles affects the electrical properties of battery. When the particle size of the inorganic particles is too large, the gaps between the particles become too large to cause the generation of the lithium dendrites which may induce short circuits. Therefore, the average particle diameter (D50) of the inorganic particles is between 0.1 μm and 2.0 μm, and preferably between 0.2 μm and 1.5 μm.

In the separator of the present invention, the binder suitable for the inorganic layer of the porous film is not particularly limited and can be the one suitably used in the separator field, such as binders having properties of high electrochemical stability, good wettability and chemical resistance to the electrolyte. In an embodiment of the present invention, the binder is, for example but not limited to, ethylene-vinyl acetate copolymer (EVA), poly(meth)acrylate, cross-linked (meth)acrylic resin, fluororubber, styrene-butadiene rubber (SBR), polyvinyl alcohol (PVA), polyvinyl butyral (PVB), polyvinylpyrrolidone (PVP), poly-n-vinyl acetamide, polyvinylidene fluoride (PVDF), polyurethane, or combinations thereof.

In the separator of the present invention, the inorganic layer can be coated on the enhanced porous polyolefin substrate by, for example but not limited to, bar coating, blade coating, dip coating, roll coating, spin coating, slot-die coating.

In the separator of the present invention, the compression resistance of the separator is more than 90% after being compressed with a load of 88 Kgf/cm$^2$ for 30 seconds, which can inhibit the deformation of the pores of the separator and maintain the ionic conductivity in the thickness direction of the separator. And because the pores of the separator are not excessively deformed due to stress after being compressed, a certain air permeability can still be maintained, that is, the decreasing rate of air permeability (Gurley) after being compressed of the separator is less than 40%, and thereby the increase of the internal resistance or internal pressure of the battery caused by the stress generated during use can be avoided.

The "compression resistance" is calculated from the initial thickness (T1) of the separator and the compressed thickness (T2) measured after being compressed with a load of 88 Kgf/cm$^2$ for 30 seconds according to the following formulas:

$$\text{Compression rate (\%)} = (T1 - T2)/T1 \times 100$$

$$\text{Compression resistance} = 100\% - \text{Compression rate (\%)}$$

The "decreasing rate of air permeability (Gurley, sec/100c.c.) after being compressed" means that the structure of the separator is damaged after being compressed with a load of 88 Kgf/cm$^2$ for 30 seconds, and results in the decreasing rate of air permeability. The decreasing rate is calculated from the Gurley number before being compressed (G1) and Gurley number after being compressed with a load of 88 Kgf/cm$^2$ for 30 seconds (G2) according to the formula:

$$\text{Decreasing rate of air permeability after being compressed (\%)} = (1 - G1/G2) \times 100\%$$

The separator of the present invention has high temperature shrinkage resistance and high puncture strength, and the thermal rupture temperature thereof is more than 160° C., so as to have a melting integrity at high temperature to prevent the electrodes from contacting each other and increase the safety of the battery.

Another aspect of the present invention is to provide a method for manufacturing a separator which comprises the steps of providing a porous polyolefin substrate; pre-strengthening the porous polyolefin substrate to form an enhanced porous polyolefin substrate, wherein the step of pre-strengthening comprises sequentially applying a 0.1 wt % to 3 wt % titanium alkoxide solution and a 30 wt % to 70 wt % alcohol solution to the porous polyolefin substrate; and coating an inorganic layer comprising a plurality of inorganic particles and a binder on at least one surface of the enhanced porous polyolefin substrate.

According to an embodiment of the above-mentioned method, the titanium alkoxide solution in the step of pre-strengthening the porous polyolefin substrate is titanium methoxide solution, titanium ethoxide solution, titanium isopropoxide solution, titanium tert-butoxide solution, or combinations thereof, preferably titanium isopropoxide solution, and the solvent of the titanium alkoxide solution is methanol, ethanol, isopropanol, or combinations thereof. In a preferred embodiment of the present invention, the titanium alkoxide solution for pre-strengthening treatment is preferably a 0.2 wt % to 2.5 wt % titanium alkoxide solution.

According to an embodiment of the above-mentioned method, the alcohol solution in the step of pre-strengthening the porous polyolefin substrate is methanol solution, ethanol solution, isopropanol solution, ethoxyethanol solution, allyl alcohol solution, ethylene glycol solution, or combinations thereof. In a preferred embodiment of the present invention, the alcohol solution is methanol solution, ethanol solution, isopropanol solution, or combinations thereof. In a preferred embodiment of the present invention, the alcohol solution is preferably a 40 wt % to 60 wt % alcohol solution.

According to an embodiment of the above-mentioned method, the titanium alkoxide solution in the step of pre-strengthening the porous polyolefin substrate further comprises a stabilizer of 0.5 wt % to 5 wt % hexamethyldisilazane to stabilize the titanium alkoxide, wherein the using amount of the stabilizer in the titanium alkoxide solution is 0.5 wt % to 3 wt %, preferably 0.5 wt % to 2 wt %.

According to an embodiment of the above-mentioned method, the alcohol solution in the step of pre-strengthening the porous polyolefin substrate further comprises a tackifier to enhance the adherence between the titanium oxide and/or titanium hydroxide, which is formed after the reaction of the titanium alkoxide with the alcohol solution, and the surfaces of the porous polyolefin substrate and the inner walls of the porous structures. Suitable tackifiers can be, for example but not limited to, poly(meth)acrylate, crosslinkable (meth) acrylic resin, poly-n-vinylacetamide, acrylonitrile-acrylate copolymer, acrylonitrile-acrylamide-acrylate copolymer, or combinations thereof. In a preferred embodiment of the present invention, one or more than one tackifier can be used in the alcohol solution.

According to an embodiment of the above-mentioned method, the using amount of the tackifier in the alcohol solution is 0.01 wt % to 1 wt %, and preferably 0.05 wt % to 0.5 wt %.

According to an embodiment of the above-mentioned method, the alcohol solution further comprises additives such as antistatic agents, flame retardants, antioxidants, or surface modifiers as required.

According to an embodiment of the above-mentioned method, the applying method of the step of pre-strengthening can be dip coating or spray coating.

According to an embodiment of the above-mentioned method, the inorganic layer comprising a plurality of inorganic particles and a binder can be coated on one or both surfaces of the enhanced porous polyolefin substrate, wherein the inorganic layer contains 80 wt % to 99 wt % of inorganic particles and 1 wt % to 20 wt % of binder.

According to an embodiment of the above-mentioned method, the inorganic layer can be coated on the enhanced porous polyolefin substrate by, for example but not limited to, bar coating, blade coating, dip coating, roll coating, spin coating, slot-die coating.

The present invention will be explained in further detail with reference to the examples. However, the present invention is not limited to these examples.

EXAMPLES

Preparation Example: Preparation of Inorganic Particles Coating Solution 38 g of $Al_2O_3$ particles (CQ-030EN, available from Shandong Sinocera Functional Materials Co., Ltd., CN), 3.4 g of polyacrylate, 0.68 g of ammonium polyacrylate (BYK-154, solid content 42%, available from BYK, Germany), 0.13 g of polyether-modified silicone surfactant (BYK-349, available from BYK, Germany), and 52.9 g of deionized water were mixed and well-stirred to obtain an inorganic particles coating solution.

Example 1: Preparation of a Separator 196 g of anhydrous alcohol (99.5%) was mixed and well-stirred with 4 g of titanium isopropoxide (TTIP) to generate a titanium isopropoxide solution. Then, 98.4 g of deionized water and 98.4 g of ethanol (95%) were mixed and well-stirred to generate an ethanol solution.

A porous polyethylene substrate with a thickness of 9 μm (porosity of 48%) was immersed in the titanium isopropoxide solution of this example for 1 minute and used a scraper to remove residual solution on the surface, and then immersed in the ethanol solution. The porous polyethylene substrate was taken out and dried at 80° C. to obtain an enhanced porous polyethylene substrate.

The inorganic particle coating solution prepared in Preparation Example was coated on the obtained enhanced porous polyethylene substrate and dried to form inorganic layers respectively having a thickness of 2 μm on both opposite surfaces of the enhanced porous polyethylene substrate to obtain a separator with a total thickness of 13 μm.

The obtained separator was tested by the following methods. The testing results were shown as the following Table 1.

Thickness of separators: The thickness was measured according to GB/T6672-2001. Thickness Analyzer (VL-50-B, available from Mitutoyo, Japan) was used to measure the thickness of the separators. The measurement was conducted by a flat probe with a diameter of 3 mm under a measuring force of 0.01N.

Measurement of Gurley number: The Gurley number was measured according to ASTM D-726. The separator was cut into a sample of 1 inch×1 inch and tested by an air permeability tester. The Gurley number was obtained by measuring the time for 100 C.C. of air to pass through the separator.

Thermal shrinkage test: The separator was cut into a sample of 10 cm×10 cm, and the initial length in machine direction (MD) and the initial length in transverse direction (TD) were measured and marked as M0 and T0 on the center of the sample before testing. Then the marked sample was sandwiched between two A4 papers and heated in an oven at 150° C. for 1 hr. After heating, the sample was removed out of the oven and put in the same environment as that of the thermal shrinkage measuring instrument for 30 minutes, and then the length in machine direction (MD) and the length in transverse direction (TD) were measured and marked as M1 and T1.

$$\text{The thermal shrinkage rate (SMD) in machine direction (MD)}=(M0-M1)/M0\times100\%$$

$$\text{The thermal shrinkage rate (STD) in transverse direction (TD)}=(T0-T1)/T0\times100\%$$

Mechanical strength test: The mechanical strength was tested according to ASTM D882-09. The separator was cut along the machine direction (MD) and the transverse direction (TD) to obtain a sample with a width of 10 mm and a length≥150 mm. The obtained sample was tested by utilizing a universal tensile machine to stretch at a rate of 500 mm/min to obtain the maximum load during the broken of the sample. The mechanical strength in the machine direction (MD) and the mechanical strength in the transverse direction (TD) were respectively calculated by dividing the maximum load with the cross-sectional area of the separator (width of the sample×the thickness of the substrate).

Puncture resistance: The puncture resistance was measured by a tensile tester (MSG-5, available from Kato Tech, Japan). The separators were punctured by a round head stainless steel needle with a diameter of 1 mm and a corner radius of 0.5 mm at a speed of 100±10 mm/min. The maximum force for puncturing the separator was recorded.

Absorptivity test: The separator for testing is cut into a sample of 80 mm×10 mm, and the sample was vertically hung and soaked in a solvent (mixture of propylene carbonate (PC) and diethyl carbonate (DEC) in a weight ratio of 1:1) in a closed space, and the initial level height of the solvent was marked on the sample as a starting point. After 1 minute, the capillary absorbing height from the starting point of the sample was measured.

Measurement of contact angle: The contact angle of the separator sample was measured by the Surface Electro Optics (SEO) Phoenix-150 contact angle measuring instrument (available from Applied Microtech Inc., Taiwan), wherein propylene carbonate (PC, with a purity of 99%) was absorbed by an syringe with a needle diameter of 2 mm and installed on Phoenix-150, and the separator sample was fixed on the sample carrier of Phoenix-150, and then a volume droplet of the propylene carbonate (PC, with a purity of 99%) was injected onto the separator sample by the syringe, and the contact angle of the separator sample was determined after being measured with the optical system CCD and calculated by the computer software of Phoenix-150.

Impedance test: The separator for testing was cut into a sample with a diameter of 24 mm, and immersed in an electrolyte for 10 minutes, and then sandwiched between two stainless steel electrodes to separate the two stainless steel electrodes and to make the two stainless steel electrodes tightly with applying a weight of 500 g, and then measured to obtain the current signal by the AC-impedance method, and the impedance value of the separator sample was calculated.

Crack test: The separator for testing is cut into a sample of 3 cm×20 cm, and placed in an oven at 200° C. for 1 hour. The sample was then taken out and visually observed to check if there was a crack appeared. Mark "X" means there is a crack appeared on the separator; Mark "Δ" means it's unable to judge because of the shrinkage of the separator; Mark "○" means there is no crack appeared on the separator.

Melt integrity: The separator was cut into a separator sample with a length of 8 mm and a width of 4.5 mm, and then the separator sample was placed into a sample tank of thermomechanical analyzer (TMA 450, available from TA Instruments, U.S.A.) under the load of 0.01N and heated up to 200° C. at a heating rate of 5° C./min. Under a fixed load of 0.01N, the separator sample reaches the heating limit with the increase of temperature, and the separator sample is determined as breaking when the deformation of the separator sample reaches the maximum value, and the temperature of breaking is defined as the thermal rupture temperature. The thermal rupture temperature of the separator sample was recorded.

Measurement of compression resistance: 50 pieces of separator of 4 cm×4 cm were stacked as a sample with an initial thickness of T1. The sample was then placed into a jig and compressed with a load of 88 Kgf/cm$^2$ for 30 seconds. The thickness of the compressed sample was measured as T2. The compression rate and the compression resistance of the sample were calculated by the following formulas:

$$\text{Compression rate (\%)} = (T1 - T2)/T1 \times 100.$$

$$\text{Compression resistance} = 100\% - \text{Compression rate (\%)}.$$

Gurley number of the separator after being compressed: The Gurley number of the separator before being compressed was measured as G1 by the above-mentioned measurement of Gurley number. Then the separator was compressed by the above-mentioned measurement of compression resistance, and the Gurley number of the separator after being compressed was measured as G2 by the above-mentioned measurement of Gurley number.

$$\text{Decreasing rate of the air permeability of the separator after being compressed (\%)} = (1 - G1/G2) \times 100\%$$

Example 2: Preparation of a Separator 196.4 g of anhydrous alcohol (99.5%) was mixed and well-stirred with 1.6 g of titanium isopropoxide (TTIP) and 2 g of hexamethyldisilazane (HMDS) at room temperature to generate a titanium isopropoxide solution. Then, 98.4 g of deionized water, 98.4 g of ethanol (95%) and 3 g of poly-N-vinylacetamide (PNVA GE191-107) were added to mixed and well-stirred, and 0.13 g of acrylonitrile-acrylamide-acrylate copolymer (BM-950B) was added thereafter to generate an ethanol solution after being well-stirred at room temperature.

A porous polyethylene substrate with a thickness of 9 μm (porosity of 48%) was immersed in the titanium isopropoxide solution of this example for 1 minute and used a scraper to remove residual solution on the surface, and then immersed in the ethanol solution. The porous polyethylene substrate was taken out and dried at 80° C. to obtain an enhanced porous polyethylene substrate.

The inorganic particle coating solution prepared in Preparation Example was coated on the obtained enhanced porous polyethylene substrate and dried to form inorganic layers respectively having a thickness of 2 μm on both opposite surfaces of the enhanced porous polyethylene substrate to obtain a separator with a total thickness of 13 μm.

The obtained separator was tested by the above methods. The testing results were shown as the following Table 1.

Example 3: Preparation of a Separator 197.2 g of anhydrous alcohol (99.5%) was mixed and well-stirred with 0.8 g of titanium isopropoxide (TTIP) and 2 g of hexamethyldisilazane (HMDS) at room temperature to generate a titanium isopropoxide solution. Then, 98.4 g of deionized water, 98.4 g of isopropanol (95%) and 3 g of poly-N-vinylacetamide (PNVA GE191-107) were added to mixed and well-stirred, and 0.13 g of acrylonitrile-acrylamide-acrylate copolymer (BM-950B) was added thereafter to generate a isopropanol solution after being well-stirred at room temperature.

A porous polyethylene substrate with a thickness of 9 μm (porosity of 48%) was immersed in the titanium isopropoxide solution of this example for 1 minute and used a scraper to remove residual solution on the surface, and then immersed in the isopropanol solution. The porous polyethylene substrate was taken out and dried at 80° C. to obtain an enhanced porous polyethylene substrate.

The inorganic particle coating solution prepared in Preparation Example was coated on the obtained enhanced porous polyethylene substrate and dried to form inorganic layers respectively having a thickness of 2 μm on both opposite surfaces of the enhanced porous polyethylene substrate to obtain a separator with a total thickness of 13 μm.

The obtained separator was tested by the above methods. The testing results were shown as the following Table 1.

Example 4: Preparation of a Separator 196.4 g of anhydrous alcohol (99.5%) was mixed and well-stirred with 1.6 g of titanium isopropoxide (TTIP) and 2 g of hexamethyldisilazane (HMDS) at room temperature to generate a titanium isopropoxide solution. Then, 98.4 g of deionized water, 98.4 g of isopropanol (95%) and 3 g of poly-N-vinylacetamide (PNVA GE191-107) were added to mixed and well-stirred, and 0.13 g of acrylonitrile-acrylamide-acrylate copolymer (BM-950B) was added thereafter to generate a isopropanol solution after being well-stirred at room temperature.

A porous polyethylene substrate with a thickness of 9 μm (porosity of 48%) was immersed in the titanium isopropoxide solution of this example for 20 seconds and used a scraper to remove residual solution on the surface, and then immersed in the isopropanol solution. The porous polyethylene substrate was taken out and dried at 80° C. to obtain an enhanced porous polyethylene substrate.

The inorganic particle coating solution prepared in Preparation Example was coated on the obtained enhanced porous polyethylene substrate and dried to form inorganic layers respectively having a thickness of 2 μm on both opposite surfaces of the enhanced porous polyethylene substrate to obtain a separator with a total thickness of 13 μm.

The obtained separator was tested by the methods described in Example 1, and the testing results were shown as the following Table 1.

Comparative Example 1

The inorganic particle coating solution prepared in Preparation Example was coated on the same porous polyethylene substrate with a thickness of 9 μm (porosity of 48%) as in Example 1 and dried.

The inorganic layers respectively having a thickness of 2 μm were formed on both opposite surfaces of the porous polyethylene substrate to obtain a separator with a total thickness of 13 μm, and the obtained separator was tested by the methods described in Example 1, and the testing results were shown as the following Table 1.

TABLE 1

Table 1. Testing results of Examples 1~4 and Comparative Examples 1

| | | Comparative Example 1 | Example 1 | Example 2 | Example 3 | Example 4 |
|---|---|---|---|---|---|---|
| Total thickness of the separator (μm) | | 13 | 13 | 13 | 13 | 13 |
| Thickness of the porous substrate (μm) | | 9 | 9 | 9 | 9 | 9 |
| Thickness Of The Inorganic Layer (μm) | | 4 | 4 | 4 | 4 | 4 |
| Gurley Number (sec/100 c.c.) | | 107 | 165 | 153 | 125 | 114 |
| Thermal Shrinkage (150 C.@1 hr) | MD | 1.5 | 1.5 | 0.75 | 1.5 | 1.5 |
| | TD | 1 | 1 | 0 | 2 | 1 |
| Mechanical Strength (Kgf/cm$^2$) | MD | 1324 | 1555 | 1622 | 1801 | 1904 |
| | TD | 1382 | 1478 | 1598 | 1469 | 2221 |
| Puncture Resistance (gf) | | 362 | 445 | 431 | 430 | 520 |
| Capillary Absorbing Height (mm) | | 5.5 | 4.5 | 5 | 4 | 4.5 |
| Contact Angle (°) | | 25 | 23.4 | 22.6 | 25.5 | 24 |
| Impedance(ohm/cm$^2$) | | 0.742 | 0.788 | 0.753 | 0.69 | 0.716 |
| Crack Test | | X | ○ | ○ | ○ | ○ |
| Thermal rupture Temperature (° C.) | | 159 | 183 | 175.3 | 172 | 168 |
| Compression Resistance (%) | | 89.2 | 97.6 | 96.9 | 94.2 | 95 |
| Gurley Number After being compressed (sec/100 c.c.) | | 178.33 | 200 | 194 | 182 | 177 |
| Decreasing Rate of air permeability After being compressed (%) | | 40% | 18% | 21% | 26% | 36% |

The separator of the present invention is obtained by pre-strengthening the porous polyolefin substrate to form an enhanced porous polyolefin substrate, and coating the inorganic layer, which can increase the mechanical strength of the porous polyolefin substrate, and enhance the tensile strength, puncture strength and compression resistance of the separator without increasing the total thickness thereof. As in the previous Examples and Comparative Example, taking the separator which is obtained by the porous polyolefin substrate with a thickness of 9 μm and coated with inorganic layers respectively having a thickness of 2 μm on the opposite surfaces thereof as an example, the mechanical strength of the porous polyolefin substrate without pre-reinforcement treatment in the MD and TD directions are less than 1400 $Kgf/cm^2$ and the puncture strength is less than 400 gf. However, the mechanical strength of the separators with enhanced porous polyolefin substrate and inorganic layers in the MD and TD directions are increased to greater than 1450 $Kgf/cm^2$ and the puncture strength are greater than 400 gf. Furthermore, the separator of the present invention has a compression resistance greater than 90%. Therefore, the separator disclosed of the present invention can enhance the tensile strength and compression resistance of the separator without increasing the total thickness thereof.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A separator, comprising:
- an enhanced porous polyolefin substrate, wherein the enhanced porous polyolefin substrate is obtained by pre-strengthening a porous polyolefin substrate; and
- an inorganic layer comprising a plurality of inorganic particles and a binder coated on at least one surface of the enhanced porous polyolefin substrate;
- wherein the enhanced porous polyolefin substrate is obtained by sequentially applying a 0.1 wt % to 3 wt % titanium alkoxide solution and a 30 wt % to 70 wt % alcohol solution to the porous polyolefin substrate.

2. The separator as claimed in claim 1, wherein pre-strengthening treatment comprises sequentially applying a 0.2 wt % to 2.5 wt % titanium alkoxide solution and a 40 wt % to 60 wt % alcohol solution to the porous polyolefin substrate.

3. The separator as claimed in claim 1, wherein the titanium alkoxide solution further comprises a 0.5 wt % to 5 wt % hexamethyldisilazane.

4. The separator as claimed in claim 1, wherein the alcohol solution further comprises a tackifier.

5. The separator as claimed in claim 4, wherein the tackifier is used in an amount of 0.01 wt % to 1 wt %.

6. The separator as claimed in claim 4, wherein the tackifier is poly(meth)acrylate, poly-n-vinylacetamide, crosslinkable (meth)acrylic resin, acrylonitrile-acrylate copolymer, acrylonitrile-acrylamide-acrylate copolymer, or combinations thereof.

7. The separator as claimed in claim 1, wherein the porous polyolefin substrate is a single-layered polyethylene substrate or a single-layered polypropylene substrate.

8. The separator as claimed in claim 1, wherein the inorganic layer comprises 80 wt % to 99 wt % inorganic particles and a 1 wt % to 20 wt % binder.

9. The separator as claimed in claim 8, wherein the inorganic particles of the inorganic layer are $Mg(OH)_2$, $BaSO_4$, $BaTiO_3$, $HfO_2$, $SrTiO_3$, $SnO_2$, $CeO_2$, MgO, NiO, CaO, ZnO, $ZrO_2$, $SiO_2$, $Y_2O_3$, $Al(OH)_3$, $Al_2O_3$, AlOOH, SiC, $TiO_2$, or combinations thereof.

10. The separator as claimed in claim 8, wherein the binder of the inorganic layer is ethylene-vinyl acetate copolymer (EVA), poly(meth)acrylate, crosslinkable (meth) acrylic resin, fluororubber, styrene-butadiene rubber (SBR), polyvinyl alcohol (PVA), polyvinyl butyral (PVB), polyvinylpyrrolidone (PVP), poly-n-vinyl acetamide, polyvinylidene fluoride (PVDF), polyurethane, or combinations thereof.

11. The separator as claimed in claim 1, wherein the separator has a compression resistance more than 90% after being compressed with a load of 88 $Kgf/cm^2$ for 30 seconds.

12. The separator as claimed in claim 1, wherein the separator has a decreased percentage of air permeability (Gurley) less than 40% after being compressed with a load of 88 $Kgf/cm^2$ for 30 seconds.

13. The separator as claimed in claim 1, wherein the separator has a thermal rupture temperature more than 160° C.

14. A method for manufacturing a separator, comprising the steps of:
- providing a porous polyolefin substrate;
- pre-strengthening the porous polyolefin substrate to form an enhanced porous polyolefin substrate, wherein the step of pre-strengthening comprises sequentially applying a 0.1 wt % to 3 wt % titanium alkoxide solution and a 30 wt % to 70 wt % alcohol solution to the porous polyolefin substrate; and
- coating an inorganic layer comprising a plurality of inorganic particles and a binder on at least one surface of the enhanced porous polyolefin substrate.

15. The method as claimed in claim 14, wherein the titanium alkoxide of the titanium alkoxide solution is titanium methoxide, titanium ethoxide, titanium isopropoxide, titanium tert-butoxide, or combinations thereof, and the solvent of the titanium alkoxide solution is methanol, ethanol, isopropanol, or combinations thereof.

16. The method as claimed in claim 14, wherein the alcohol of the alcohol solution is methanol, ethanol, isopropanol, ethoxyethanol, allyl alcohol, ethylene glycol, or combinations thereof.

17. The method as claimed in claim 14, wherein the titanium alkoxide solution is a 0.2 wt % to 2.5 wt % titanium alkoxide solution, and the alcohol solution is a 40 wt % to 60 wt % alcohol solution.

18. The method as claimed in claim 14, wherein the titanium alkoxide solution further comprises a 0.5 wt % to 5 wt % hexamethyldisilazane.

19. The method as claimed in claim 14, wherein the alcohol solution further comprises a tackifier, and a using amount of the tackifier in the alcohol solution is 0.01 wt % to 1 wt %.

20. The method as claimed in claim 19, wherein the tackifier is poly(meth)acrylate, crosslinkable (meth)acrylic resin, poly-n-vinylacetamide, acrylonitrile-acrylate copolymer, acrylonitrile-acrylamide-acrylate copolymer, or combinations thereof.

* * * * *